(12) United States Patent
Murakami

(10) Patent No.: US 7,766,382 B2
(45) Date of Patent: Aug. 3, 2010

(54) AIR BELT AND AIR BELT APPARATUS

(75) Inventor: Yoshiki Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/223,592

(22) PCT Filed: Feb. 2, 2007

(86) PCT No.: PCT/JP2007/051770

§ 371 (c)(1),
(2), (4) Date: Aug. 4, 2008

(87) PCT Pub. No.: WO2007/091486

PCT Pub. Date: Aug. 16, 2007

(65) Prior Publication Data

US 2009/0051150 A1     Feb. 26, 2009

(30) Foreign Application Priority Data

Feb. 8, 2006     (JP) .............................. 2006-031407

(51) Int. Cl.
*B60R 21/18* (2006.01)
(52) U.S. Cl. .................................................. 280/733
(58) Field of Classification Search ................ 280/733, 280/730.2, 743.1, 808
See application file for complete search history.

(56) References Cited

U.S. PATENT DOCUMENTS 3,682,498 A * 8/1972 Rutzki ........................ 280/733
3,801,156 A * 4/1974 Granig ........................ 280/733
3,841,654 A * 10/1974 Lewis .......................... 280/733
3,848,887 A * 11/1974 Fox ............................. 280/733

(Continued)

FOREIGN PATENT DOCUMENTS

DE     199 11 973 A1     9/2000

(Continued)

OTHER PUBLICATIONS

Supplementary European Search Report mailed Jun. 17, 2009, received in corresponding European Application No. 07713770.1 (3 pgs.).

*Primary Examiner*—Paul N Dickson
*Assistant Examiner*—Robert A Coker
(74) *Attorney, Agent, or Firm*—Foley and Lardner LLP

(57) ABSTRACT

A predetermined tension force is generated to an air belt even when an expandable portion is expanded in a narrow space. An air belt 30 includes a first normal belt 31, a second normal belt 32, and an expandable portion 33 therebetween. In order to regulate a thickness of the expandable portion 33 in an expanding operation, portions of the expandable portion 33 facing each other are coupled by means of a coupling portion 34 formed of a stitching thread. The expandable portion 33 includes a bag-shaped belt 33a and a knit cover 33b that is not extended in a longitudinal direction. When an inflator is operated, the expandable portion 33 is expanded and the air belt 30 fits an occupant. At this moment, since the knit cover of the expandable portion 33 is not extended in the longitudinal direction of the air belt 30, a length of the expandable portion 33 is reduced along with an expansion of the expandable portion 33 and the tension force is generated to the air belt 30.

12 Claims, 5 Drawing Sheets

U.S. PATENT DOCUMENTS

| | | | |
|---|---|---|---|
| 3,865,398 A * | 2/1975 | Woll | 280/733 |
| 3,866,940 A * | 2/1975 | Lewis | 280/733 |
| 3,888,503 A | 6/1975 | Hamilton | |
| 3,933,370 A * | 1/1976 | Abe et al. | 280/733 |
| 3,953,640 A * | 4/1976 | Takada | 428/188 |
| 3,970,329 A * | 7/1976 | Lewis | 280/733 |
| 3,975,258 A * | 8/1976 | Fox | 280/733 |
| 5,062,662 A * | 11/1991 | Cameron | 280/733 |
| 5,383,713 A * | 1/1995 | Kamiyama et al. | 297/471 |
| 5,390,953 A * | 2/1995 | Tanaka et al. | 280/733 |
| 5,466,002 A * | 11/1995 | Tanaka et al. | 280/733 |
| 5,722,685 A * | 3/1998 | Eyrainer | 280/730.2 |
| 6,286,860 B1 * | 9/2001 | Adomeit et al. | 280/733 |
| 6,419,263 B1 | 7/2002 | Büsgen et al. | |
| 6,705,641 B2 * | 3/2004 | Schneider et al. | 280/733 |
| 2002/0000715 A1 * | 1/2002 | Ohhashi | 280/733 |
| 2004/0188989 A1 * | 9/2004 | Kanto et al. | 280/730.2 |
| 2005/0189742 A1 * | 9/2005 | Kumagai et al. | 280/730.2 |

FOREIGN PATENT DOCUMENTS

| | | |
|---|---|---|
| EP | 0 652 140 A1 | 5/1995 |
| EP | 1 616 760 A1 | 1/2006 |
| JP | 2001-260807 | 9/2001 |
| JP | 2003-252143 | 9/2003 |
| JP | 2003-312439 | 11/2003 |
| JP | 2004-98753 | 4/2004 |
| JP | 2005-231504 | 9/2005 |
| JP | 2005-239055 | 9/2005 |
| JP | 2005-239129 | 9/2005 |
| JP | 2005-247188 | 9/2005 |
| JP | 2005-271888 | 10/2005 |
| WO | WO 93/24347 A1 | 12/1993 |

* cited by examiner

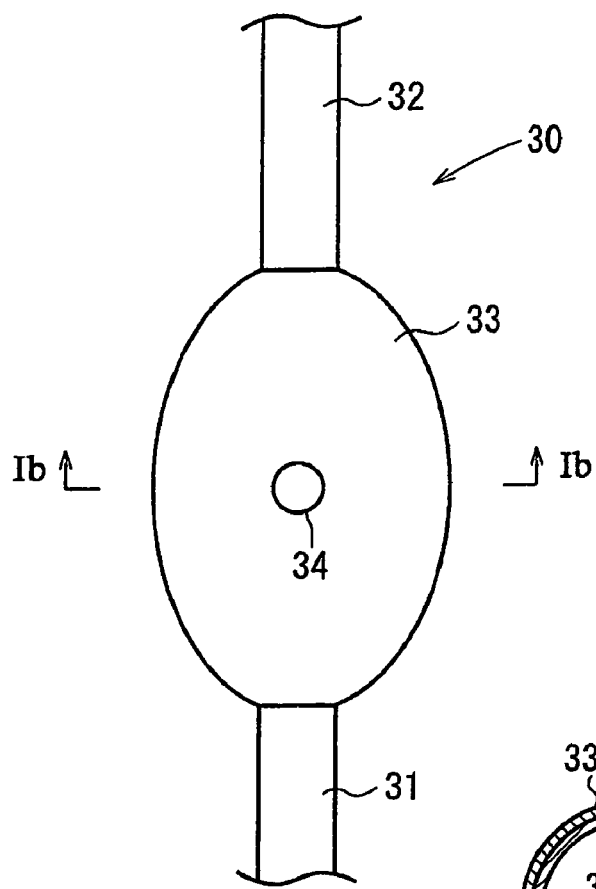
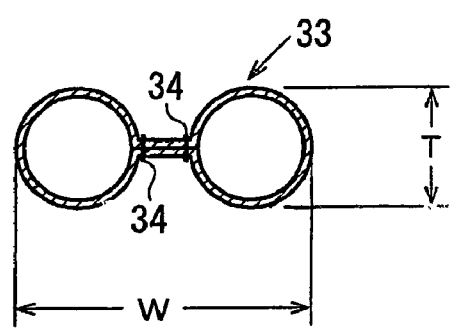
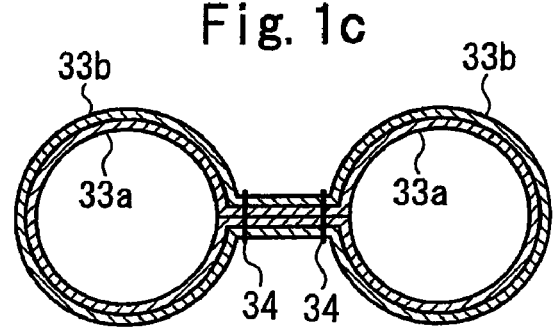
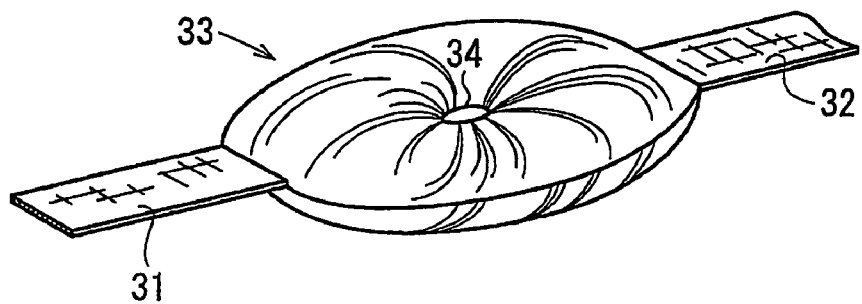

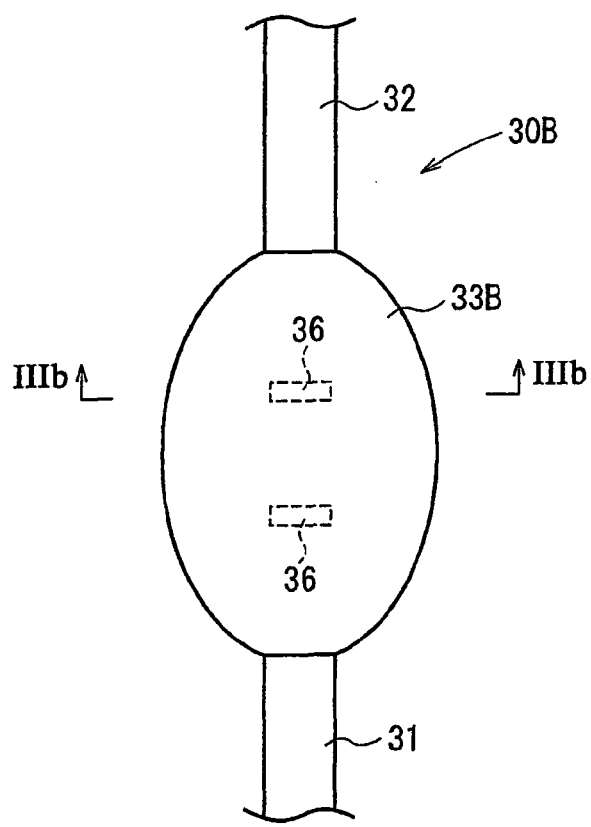
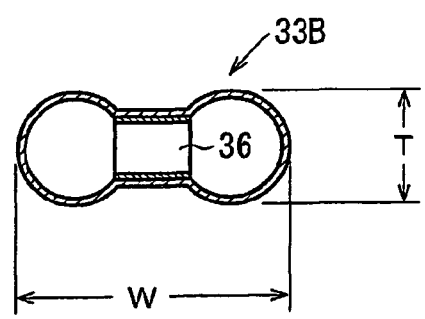
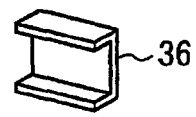
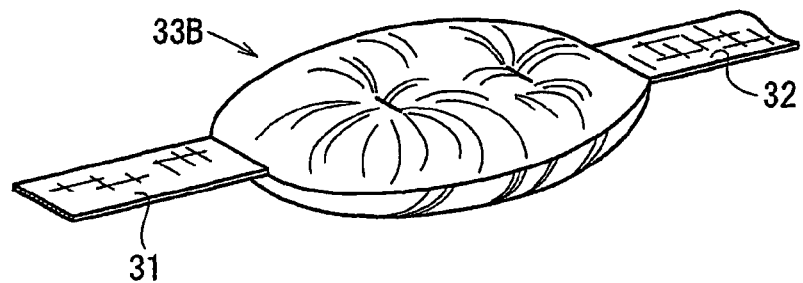

AIR BELT AND AIR BELT APPARATUS

TECHNICAL FIELD

The present invention relates to an air belt and an air belt apparatus for restraining an occupant in a collision of a vehicle, or the like, and more specifically to an air belt and an air belt apparatus in which a length in a longitudinal direction is reduced when an expandable portion thereof is expanded.

BACKGROUND ART

As an air belt apparatus, in which a part of webbing of a seat belt apparatus is configured to be an expandable portion, for example, the one described in Japanese Unexamined Patent Application Publication No. 2003-312439 is known.

FIGS. 5 and 6 illustrate the air belt apparatus described in the publication. The seat belt 20 includes a shoulder belt portion 6 and a lap belt portion 7. The shoulder belt portion 6 is withdrawn from a retractor 3 for use in a shoulder belt, which is provided at a lower part of a center pillar 2, and is extended via a through ring 5 provided at an upper part of the center pillar 2. Further, the lap belt portion 7 is withdrawn from a retractor 4 for use in a lap belt, which is provided at a lower part of the retractor 3 for use in the shoulder belt, and is extended via a waist portion of an occupant. At end portions of the shoulder belt portion 6 and the lap belt portion 7, a tongue apparatus 8 is provided. A buckle apparatus 9 with which the aforementioned tongue apparatus 8 is combined is provided by being fixed to a seat base 10 formed of a seat frame (not illustrated) or a slide rail (not illustrated). An inflator 11 for use in an air belt that is integrally provided with the aforementioned buckle apparatus 9 is provided therewith.

The air belt apparatus is configured to be able to softly restrain the occupant by means of that when a vehicle encounters a collision, and an acceleration sensor (not illustrated) for detecting a collision detects a predetermined value or more, a high pressure gas is generated out from the inflator 11 and the high pressure gas intrudes into bags BG1 and BG2 after passing though a gas passageway in the buckle apparatus 9 and a gas passageway in the tongue apparatus 8, and causes the webbings WG1 and WG2 of respective bag-shaped belt portions 6b and 7b of the shoulder belt portion 6 and the lap belt portion 7 to be expanded and developed.

The shoulder belt portion 6 is composed of a normal belt portion 6a that is not in contact with the occupant, and a bag-shaped belt portion 6b serving as the expanding portion. The bag-shaped belt portion 6b having a portion being in contact with a chest portion of the occupant is constructed from the webbing WG1 formed into a bag shape, which generates tension force at a time of the collision of the vehicle. The tension force of the webbing WG1 is generated along with an expansion of the webbing WG1 that is constructed from a circular knitting fabric. The bag BG1 is housed in an inside of the webbing WG1 of the bag-shaped belt portion 6b of the shoulder belt portion 6.

The lap belt portion 7 is composed of a normal belt portion 7a that is not expanded and developed but is in contact with the waist portion of the occupant, and a bag-shaped belt portion 7b having a portion that is in contact with the waist portion of the occupant and is expanded and developed. This bag-shaped belt portion 7b is provided with the webbing WG2 formed into a bag shape, which generates tension force at a time of a collision of a vehicle. The tension force of the webbing WG2 is generated along with an expansion of the webbing WG2 constructed from the circular knitting fabric. The bag BG2 is housed in an inside of the webbing WG2 of the bag-shaped belt portion 7b of the lap belt portion 7.

[Patent Document 1] Japanese Unexamined Patent Application Publication No. 2003-312439

In a case that the air belt is provided with a bag-shaped belt and a knit cover surrounding the bag-shaped belt, and the knit cover is not practically extended in a longitudinal direction of the air belt, while the same is extendable in an expanding direction of the air belt, and that the length of the knit cover in the longitudinal direction is reduced at a time when the knit cover is expanded, the length of the air belt is entirely reduced along with the expansion of the air belt, and the air belt is brought to fit the occupant.

However, in a case that at least a part of the expandable portion is expanded in a manner so as to be sandwiched in a narrow space between a seat and a side surface portion of the vehicle, and the expansion of the expandable portion is limited by the seat and the side surface portion of the vehicle, and is not fully expanded, the tension force generated in the air belt becomes smaller than the tension force generated at a time when the expandable portion is fully expanded. Hitherto, even in such a case, actions such as raising the gas pressure generated by means of an inflator so that the necessary tension force is generated, increasing the length of the expandable portion, or the like is required. This necessitates complicated designing work.

SUMMARY OF THE INVENTION

It is an object of the present invention to provide an air belt to which tension force as designed is generated when an expandable portion is expanded, and an air belt apparatus provided with the air belt.

An air belt of a first aspect of the present invention is characterized in that in an air belt including an expandable portion, in which the length of the expandable portion in a longitudinal direction of the air belt is reduced when the expandable portion is expanded, when the expandable portion is expanded, and when a maximum width of the expandable portion in a cross-section in a direction perpendicular to the longitudinal direction of the air belt is defined as W, and a maximum thickness of the expandable portion in a direction perpendicular to the maximum width W is defined as T, the maximum thickness T is smaller than the maximum width W.

The maximum thickness T may be configured to be smaller than the maximum width W by means of coupling the portions facing each other in the maximum thickness direction when the expandable portion is expanded.

The maximum thickness T may be 30 to 99% of the maximum width W.

An air belt apparatus of a second aspect is provided with the air belt of the first aspect and an inflator that expands the air belt by means of supplying a gas thereinto.

At least a part of the air belt may be disposed between a side surface of a seat and a side surface portion of a vehicle in a wearing state of the air belt.

BRIEF DESCRIPTION OF DRAWINGS

FIGS. 1a through 1d are views illustrating an air belt at an expanded time according to an embodiment, in which FIG. 1a is a front elevation, FIG. 1b is a cross-sectional view taken along a line Ib-Ib of FIG. 1a, FIG. 1c is a schematic enlarged view of FIG. 1b, and FIG. 1d is a perspective view illustrating the air belt.

FIGS. 2a through 2d are views illustrating an air belt at an expanded time according to another embodiment, in which FIG. 2a is a front elevation, FIG. 2b is a cross-sectional view taken along a line IIb-IIb of FIG. 2a, FIG. 2c is a perspective view illustrating a tether, and FIG. 2d is a perspective view illustrating the air belt.

FIGS. 3a through 3d are views illustrating an air belt at an expanded time according to still another embodiment, in which FIG. 3a is a front elevation, FIG. 3b is a cross-sectional view taken along a line IIIb-IIIb of FIG. 3a, FIG. 3c is a perspective view illustrating a tether, and FIG. 3d is a perspective view illustrating the air belt.

FIGS. 4a through 4c are views illustrating an air belt at an expanded time according to another embodiment, in which FIG. 4a is a front elevation, FIG. 4b is a cross-sectional view taken along a line IVb-IVb of FIG. 4a, and FIG. 4c is a perspective view illustrating the air belt.

DETAILED EXPLANATION

Figure 2A:
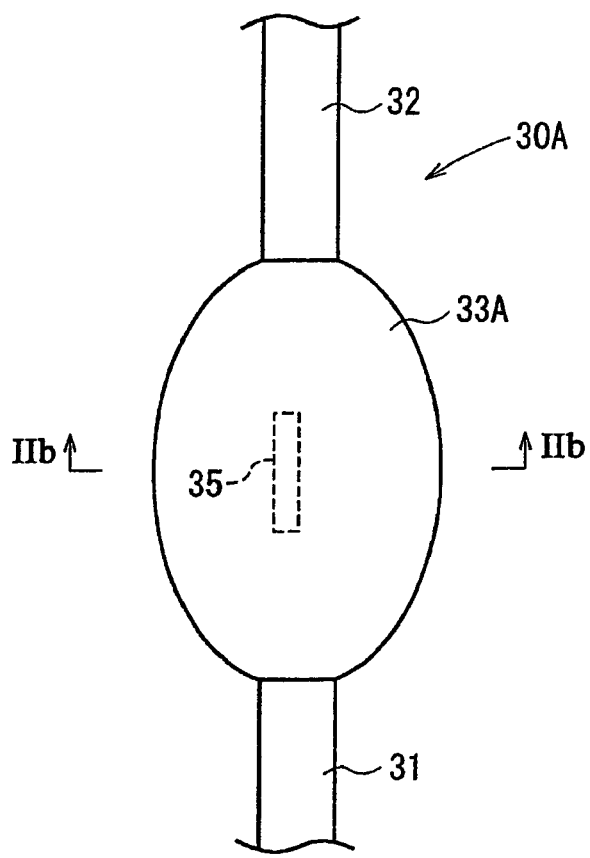

In an air belt of a first aspect, a maximum thickness T is formed to be smaller than a maximum width W at a time when an expandable portion is expanded. Hence, a predetermined tension force is generated at the expandable portion by means of configuring the maximum thickness T to be approximately equal to a space width between a seat and a side surface portion of a vehicle or less.

The maximum thickness T can easily be regulated by forming a construction in which the maximum thickness T is brought to be smaller than the aforementioned maximum width W by means of coupling the portions facing each other in a direction of the maximum thickness of the air belt.

Hereinbelow, an embodiment will be explained with reference to the drawings. FIGS. 1a through 1d are views illustrating an air belt at an expanded time according to an embodiment, in which FIG. 1a is a front elevation, FIG. 1b is a cross-sectional view taken along a line Ib-Ib of FIG. 1a, FIG. 1c is a schematic enlarged view of FIG. 1b, and FIG. 1d is a perspective view illustrating the air belt.

An air belt 30 is provided with a first normal belt 31, a second normal belt 32, and an expandable portion 33 between the same.

The expandable portion 33 is provided with a bag-shaped belt 33a and a knit cover 33b formed of a fabric surrounding the bag-shaped belt 33a, as illustrated in FIG. 1c. This knit cover 33b is constructed such that the same is not practically extended in a longitudinal direction by means of performing a heating drawing process, whereas the same flexibly expands and contracts in a width direction.

A tip end of the first normal belt 31 is coupled with an anchor (not illustrated), and a base end thereof is stitched to an end of the expandable portion 33. A tip end of the second normal belt 32 is stitched to the other end of the expandable portion 33.

Figure 5:
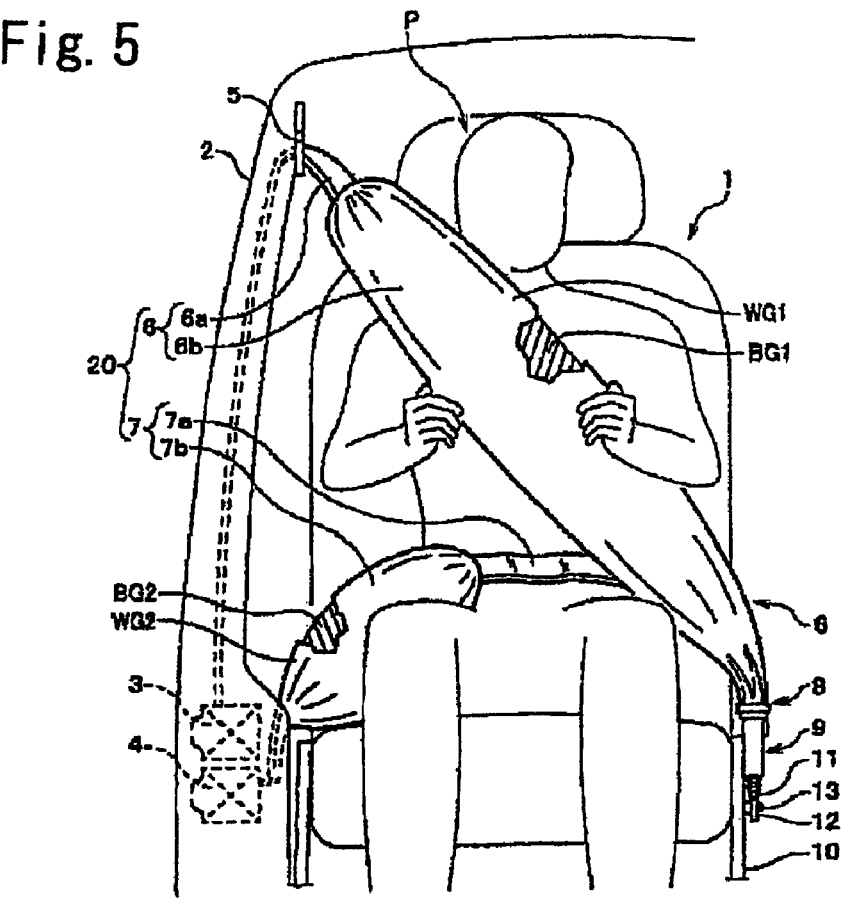
FIG. 5 is a front elevation illustrating a hitherto known example.
Figure 6:
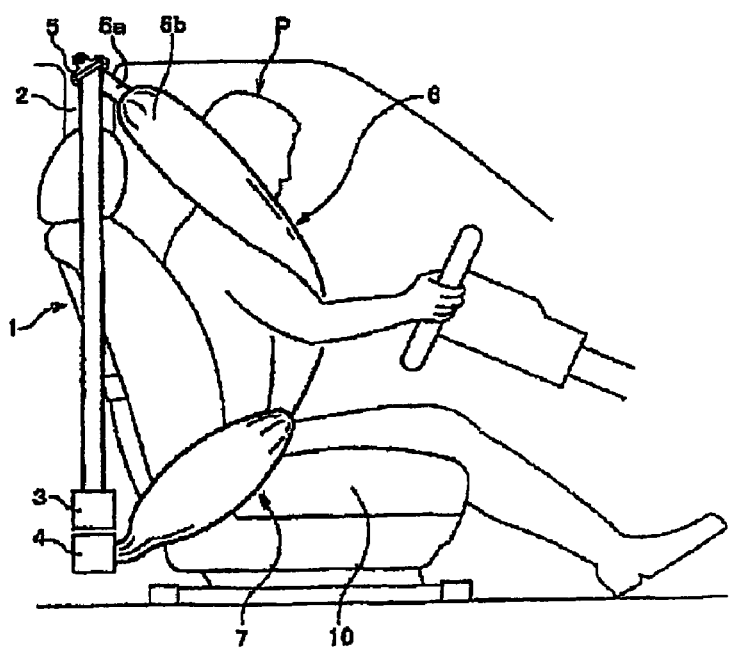
FIG. 6 is a side elevation illustrating a hitherto known example.

The air belt 30 is the one that is used in a lap belt portion 7 of the aforementioned FIGS. 5 and 6.

A gas tube (not illustrated) is inserted into the first normal belt 31, and a tip end of the gas tube reaches an inside of the expandable portion 33. A base end of the gas tube is coupled with an inflator (not illustrated). The inflator may be attached to the seat or may be attached to a vehicle member such as a vehicle body floor, a pillar, or the like.

Incidentally, although the first normal belt 31 is coupled with the expandable portion 33 in this embodiment, the inflator, a pipe-shaped member continued into the inflator, or the like may be directly coupled with the expandable portion 33. Further, it is applicable that a tongue is attached to the tip end of the first normal belt, and the tongue is configured to be attached to or detached from the buckle. In this case, it is sufficient that a blowing-out coupler for blowing out a gas from the inflator is provided in the buckle, and a gas-receiving coupler, which is attached to or detached from the blowing-out coupler, is provided in the tongue.

In order to regulate the thickness of the aforementioned expandable portion 33 at the time when expanded, in this embodiment, the portions of the bag-shaped belt 33a, which face each other, are coupled by means of a coupling portion 34 formed of a stitching thread. The coupling portion 34 couples not only the bag-shaped belt 33a but also the portions of the knit cover 33b facing each other.

This coupling portion 34 is provided at one place in the vicinity of the middle portion in a longitudinal direction of the air belt 30 in the expandable portion 33, and in the vicinity of the middle portion in a direction of the maximum width W, described later. However, the coupling portion 34 may be provided two or more in number at intervals in the longitudinal direction of the air belt 30. Furthermore, when the width of the expandable portion 33 is large, the coupling portion 34 may be provided two or more in number at intervals in the direction of the maximum width W. Although the coupling portion 34 has a ring shape, the same may also have an elliptic ring shape.

By means of providing the coupling portion 34, the expandable portion 33 is expanded in a flat shape. The maximum width W and the maximum thickness T of the expandable portion 33 at the time when the same is expanded are respectively illustrated in FIG. 1b. The maximum width W is the maximum width in a direction perpendicular to the longitudinal direction of the air belt 30. The maximum thickness is the maximum thickness of the expandable portion 33 in a direction perpendicular to the direction of the maximum width W.

Incidentally, a percentage of the maximum thickness T to the maximum width W: $T/W \times 100\%$ is preferable to be from about 30 to about 99%, and specifically, from about 40 to about 80%. Moreover, the maximum thickness T is preferable to be about 140 mm or less, i.e., for example, from about 60 mm to 100 mm.

This air belt 30 is preferable to be used as a lap belt, and the second normal belt 32 is pulled around along a front surface of a waist portion of the occupant.

In an air belt apparatus provided with the thus constructed air belt 30, when the inflator is operated along with a collision of an automobile, or the like, the gas from the inflator is supplied to the expandable portion 33, the expandable portion 33 is expanded, and the air belt 30 fits the occupant. At this moment, since the knit cover of the expandable portion 33 is not extended in the longitudinal direction of the air belt 30, a length of the expandable portion 33 is reduced along with the expansion of the expandable portion 33, and the tension force is generated in the air belt 30.

In this embodiment, the expandable portion 33 is expanded in a flat shape, and thereby even in a case that a part of or entire expandable portion 33 exists in a narrow space between the seat and the side surface portion of the vehicle such as a door trim, a B pillar, or the like, the expandable portion 33 can be expanded up to an approximately fully open condition by means of forming the maximum thickness T of the expandable portion 33 to have an approximately the same width of the space or less, and the predetermined tension force is generated to the expandable portion 33.

Hence, the occupant can be restrained by generating the tension force at the value as designed, to the air belt 30 without taking steps such as using an inflator having a large output power, extending the length of the expandable portion, or the like.

Figure 2B:
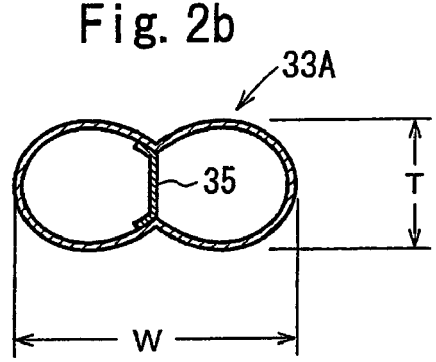
Figure 2C:
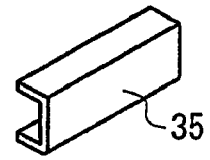
Figure 2D:
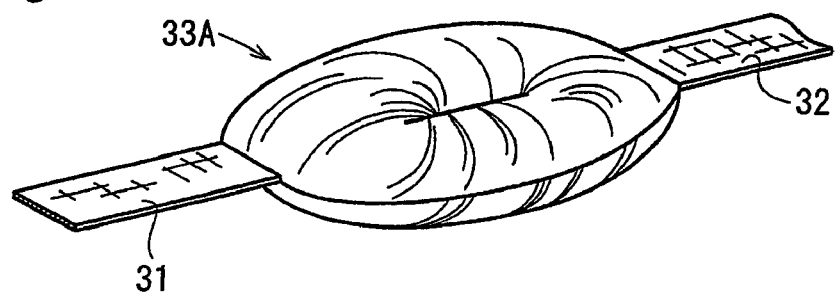

FIGS. 2a through 2d are views illustrating an air belt at an expanded time according to another embodiment, in which FIG. 2a is a front elevation, FIG. 2b is a cross-sectional view taken along a line IIb-IIb of FIG. 2a, FIG. 2c is a perspective view illustrating a tether, and FIG. 2d is a perspective view illustrating the air belt.

In this embodiment, the coupling portion is constructed of a tether 35 instead of the coupling portion 34 formed of the stitching thread. The tether 35 is coupled with respective faces of the bag-shaped belt 33A facing each other at a time of expanding operation thereof, by means of a stitching operation or the like. This tether 35 extends in a longitudinal direction of the air belt 30A. Further, this tether 35 is positioned at a center in a direction of the maximum width W. By means of providing the tether 35, the thickness of an expandable portion 33B at the time of expanding operation is regulated.

FIGS. 3a through 3d are views illustrating an air belt at an expanded time according to still another embodiment, in which FIG. 3a is a front elevation, FIG. 3b is a cross-sectional view taken along a line IIIb-IIIb of FIG. 3a, FIG. 3c is a perspective view illustrating a tether, and FIG. 3d is a perspective view illustrating the air belt.

In this embodiment, the thickness of expanded expandable portion 33B is also regulated by means of the tether 36. This tether 36 extends in a direction of the maximum width W. Although the tether 36 is provided two in number at an interval in the longitudinal direction of the air belt 30B, the same may be provided three or more in number.

Figure 4A:
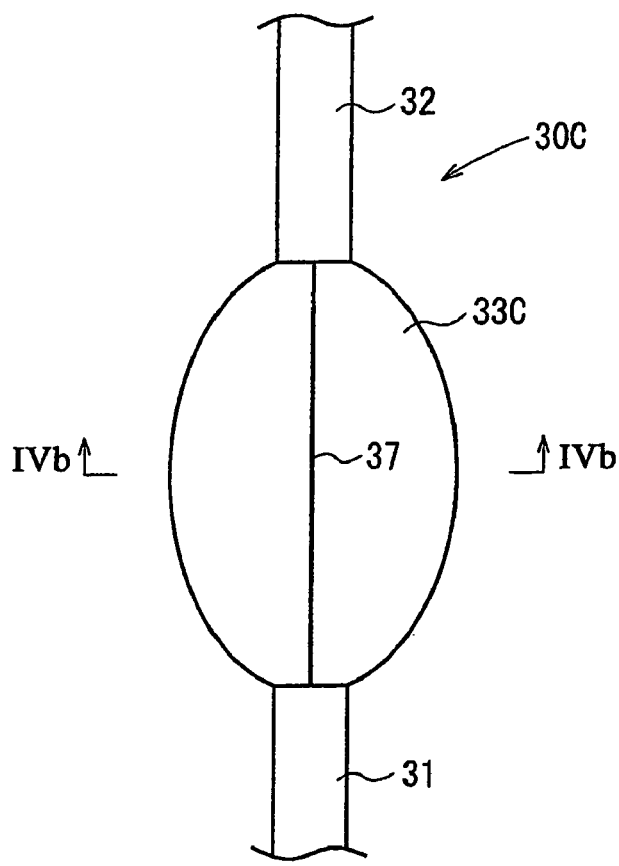
Figure 4B:
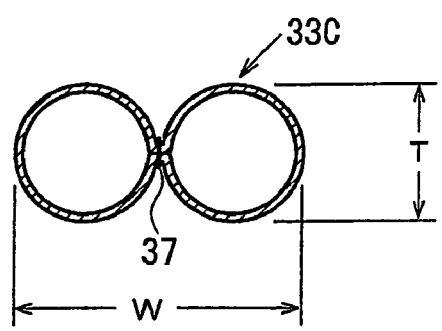
Figure 4C:
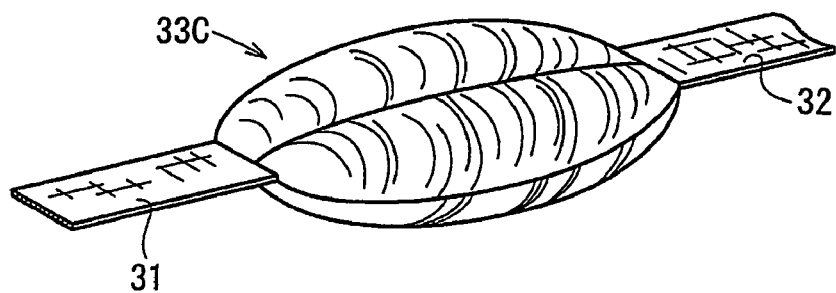

FIGS. 4a through 4c are views illustrating an air belt at an expanded time according to another embodiment, in which FIG. 4a is a front elevation, FIG. 4b is a cross-sectional view taken along a line IVb-IVb of FIG. 4a, and FIG. 4c is a perspective view illustrating the air belt.

In an air belt 30C in this embodiment, a straight-line-shaped coupling portion 37 formed of the stitching thread extends from one end to the other end of the expandable portion 33C in the longitudinal direction. By means of the coupling portion 37, an inside of the expandable portion 33C is partitioned into two chambers of one half-side and the other half-side in the direction of the maximum width W, and each of the chambers is expanded by means of the gas from the inflator, respectively.

Incidentally, the length of the coupling portion 37 may be shorter than the length from one end to the other end of the expandable portion 33C. Further, two or more ridges of the coupling portions 37 may be provided. A plurality of ridges of the coupling portions 37 being extending approximately in parallel with each other may be provided.

Other construction of these air belts 30A, 30B, 30C is the same as that of the aforementioned air belt 30, and therefore the same reference numerals denote the same elements. Incidentally, in FIGS. 2a through 4c, although not illustrated, the expandable portion is also composed of a bag-shaped belt and a knit cover. By means of using these air belts 30A through 30C, the same advantage as that of the air belt 30 is also obtained.

Any of the aforementioned embodiments is an example of the present invention, and the present invention can also employ the configurations other than that illustrated above. For example, a device to regulate the maximum thickness of the expandable portion is not limited to that illustrated in the drawings. In addition, the air belt of the present invention may be applied to a shoulder belt.

Incidentally, the present invention is based on Japanese Patent Application (Japanese Patent Application No. 2006-031407) filed on Feb. 8, 2006, the entire contents of which are incorporated by reference.

The invention claimed is:

1. An air belt comprising:
    an expandable portion, in which a length of the expandable portion in a longitudinal direction of the air belt is reduced when the expandable portion is expanded; and
    a coupling portion connecting opposite sides of the expandable portion, wherein the coupling portion is located in the expandable portion along a longitudinal centerline of the air belt;
    wherein, when the expandable portion is expanded, a maximum width of the expandable portion in a cross-section in a direction perpendicular to the longitudinal direction of the air belt is defined as W, and a maximum thickness of the expandable portion in a direction perpendicular to the maximum width W is defined as T, wherein the maximum thickness T is restrained by the coupling portion and is smaller than the maximum width W.

2. The air belt according to claim 1, wherein the maximum thickness T is 30 to 99% of the maximum width W.

3. The air belt according to claim 1, wherein the maximum thickness T is 40 to 80% of the maximum width W.

4. The air belt according to claim 1, wherein the coupling portion is formed of a stitching thread.

5. The air belt according to claim 4, wherein the coupling portion is formed into a ring shape or an elliptic ring shape.

6. The air belt according to claim 4, wherein the coupling portion is formed into a straight-line shape.

7. The air belt according to claim 6, wherein the coupling portion extends in the longitudinal direction of the air belt.

8. The air belt according to claim 1, wherein the coupling portion is formed of a tether.

9. An air belt apparatus comprising: an expandable air belt, and an inflator expanding the air belt by supplying a gas into the air belt, wherein the air belt is the air belt according to claim 1.

10. The air belt apparatus according to claim 9, wherein at least a part of the air belt is disposed between a side surface of a seat and a side surface portion of a vehicle in a wearing state of the air belt.

11. The air belt according to claim 1, wherein the expandable portion includes a bag-shaped belt and a knit cover surrounding the bag-shaped belt.

12. The air belt according to claim 11, wherein the knit cover of the expandable portion is not extendable in the longitudinal direction of the air belt.

* * * * *